July 19, 1938. N. GOLD Re. 20,806

NECKTIE

Original Filed Nov. 25, 1935

NATHAN GOLD
INVENTOR

BY James D. Sinnau
ATTORNEY

Reissued July 19, 1938

Re. 20,806

UNITED STATES PATENT OFFICE 20,806

NECKTIE

Nathan Gold, Portland, Oreg.

Original No. 2,082,447, dated June 1, 1937, Serial No. 51,355, November 25, 1935. Application for reissue January 15, 1938, Serial No. 185,234

9 Claims. (Cl. 2—146)

This invention relates to improvements in neckties and more particularly to the method of uniting or stitching together the various elements of the tie structure such as the tie casing, lining and reinforcing strip in such a way as to render the entire tie stretchable in the direction of its length without straining or breaking the stitches. Each stitch is so formed that it will yield in the direction of a lengthwise pull exerted on the tie and a portion of each stitch will, at the same time, contract into a tight grip on the wrap and weft of the tie elements it embraces.

The entire stitching throughout the length of the tie is formed by a single length of thread. The stitches may be arranged in any desired spaced relation and, being interconnected, will progressively absorb any lengthwise stresses applied to the tie.

One of the principal objects of the invention is the provision of a stitch or stitches of this character which will not only function as aforesaid, but which may be so arranged that only a very small amount of thread will underlie the front wall of the casing so that when the tie is pressed, no high spots or shiny spots will appear at each of the points where the stitch or stitches come in contact with the underside of the front wall of the casing, especially under a hot iron or other pressing implement.

Another object of the invention is the provision of a series of interconnected stitches, as aforesaid, which, if the thread should break, will arrest the loosening or slipping of the thread on both sides of the break. In other words, when a lengthwise pull is exerted on the tie, each stitch, as aforesaid, will tightly grip the fabric of the tie elements. If a further pull is exerted to break the thread, the stitches previously tightened will remain so when the tie is relaxed.

These and other objects will appear as my invention is more fully hereinafter described in the following specification, illustrated in the accompanying drawing and finally pointed out in the appended claims. In the drawing, Figure 1 is an assembly view of my new and improved necktie with a part of the casing opened up to illustrate the structural characteristics of the tie;

Figure 1:
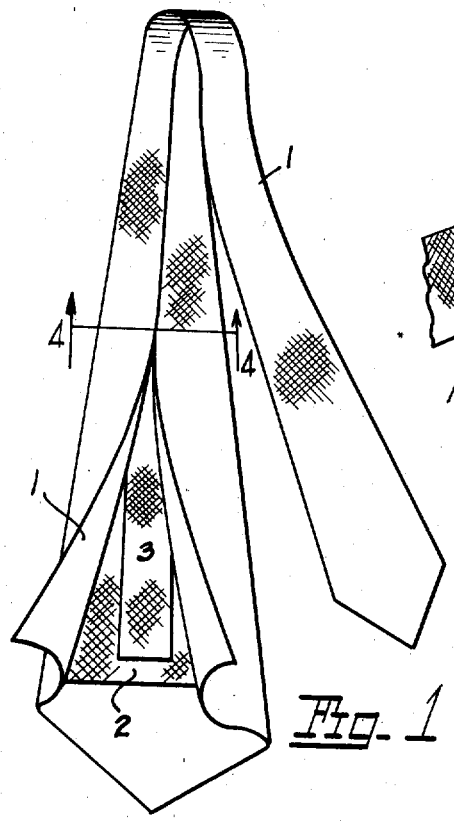

Referring now more particularly to the drawing, reference numeral 1 indicates the tie casing which is of usual tubular formation cut to any desired length and terminating at both its ends in any suitable pointed design or otherwise. The interior of the tie is provided with a full length lining 2, and reinforcing strip 3, both of which, as well as the tie casing, are cut on the bias so as to have a certain amount of give when subjected to a lengthwise pull. This is a desirable feature for the reason that the tie will spring back to normal after being stretched and will, therefore, preserve its neat and attractive appearance for a greater length of time than would be the case otherwise. The reinforcing strip also runs substantially the full length of the tie and is arranged along the longitudinal center line of the lining.

Figure 2:
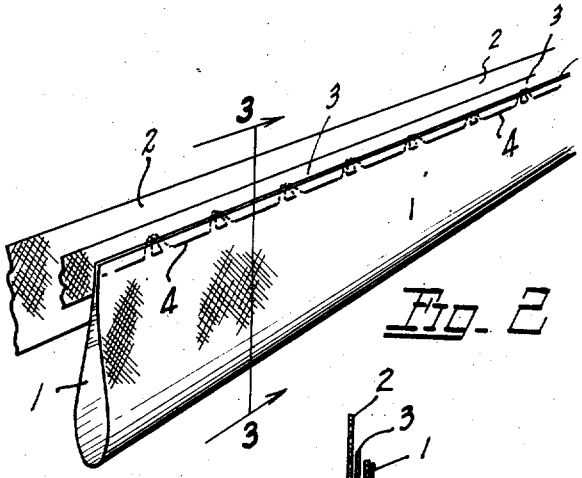
Fig. 2 is a fragmentary perspective view of the tie casing turned inside out and stitched to the lining and reinforcing strip.
Figure 3:
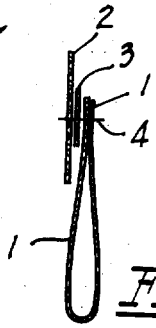
Fig. 3 is a sectional view taken on the line 3—3 of Fig. 2.
Figure 5:
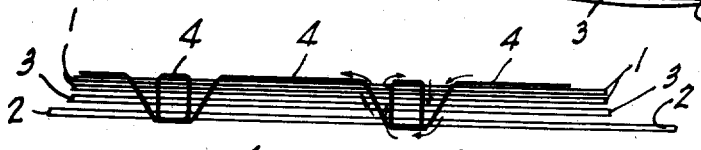
Fig. 5 is a greatly enlarged diagrammatic view of the various tie elements joined together by my improved form of stitching and disposed in a normal unstretched position.

In Fig. 2, I have illustrated the manner in which the tie casing, lining and reinforcing strip are united by my new and improved form of stitching. In assembling the tie, the lining and reinforcing strip are placed one upon the other, as aforesaid. The tie casing is folded over on itself inside-out and its edges are brought into alignment with each other as shown. These overlapping edges are arranged along the reinforcing strip and the three elements are then stitched together. As previously pointed out, the entire stitching throughout the length of the tie is formed of a single length of thread 4, and is usually started from the right-hand side and progressed to the left. In forming these interconnected stitches, as best illustrated in Fig. 5, the needle is thrust downwardly through the overlapping edges of the tie casing, the reinforcing strip and the lining. It is then advanced forwardly, then upwardly, then rearwardly, again downwardly and forwardly, thence upwardly back to the surface from which it started, and then advanced forwardly to the beginning of the next stitch, which is a repetition of the one just described. The progress of the thread to form the stitch is best illustrated by arrows in Fig. 5.

In the beginning and at the end of the stitching, the thread is, of course, knotted in the usual way.

Figure 4:
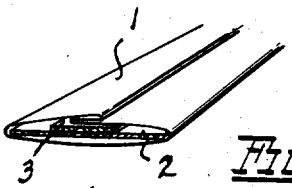
Fig. 4 is a sectional view taken approximately on the line 4—4 of Fig. 1.

When the lining, reinforcing strip and tie casing have been stitched together, the assembly is then reversed so that the casing will be right side out and will embrace the lining and reinforcing strip. This is best illustrated in Fig. 4 wherein it will also be noted that the stitching has been entirely concealed by one wall of the casing as it is folded over on itself in the reversing operation. When so folded, it will be noted that the major portion of the thread and the stitches are disposed on the back side of the tie and are protected by the folded portion of the wall of the casing. The opposite side of the stitching, namely, that portion extending through the lining and which lies directly beneath the front wall of the casing, is relatively small and presents merely a series of minute stitches which would have no effect on the appearance or condition of the front wall of the casing under pressing operations, as aforesaid.

Figure 6:
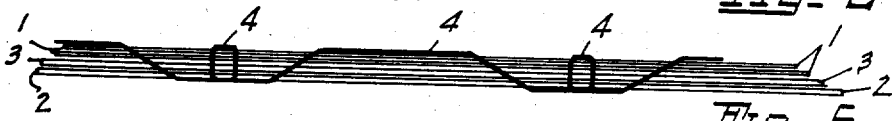
Fig. 6 is a similar diagrammatic view illustrating the approximate distortion of the stitches under lengthwise tension applied to the tie as a whole.

As previously pointed out, Fig. 5 illustrates the tie elements and stitches in their relaxed or normal position. In this position, the stitches are sufficiently tight to maintain the various elements in their proper relation, but when a lengthwise pull is exerted upon the tie, the loop portion of each stitch is tightened or contracted as shown in Fig. 6 and such tightening of the loop portion of the stitch pays out thread in both directions to provide sufficient slack for the portion of the thread interconnecting said stitches to yield to the pull on the tie.

My particular form of stitch is designed to not only accomplish the foregoing results but also to utilize a length of thread which is approximately sixty per cent longer than the stitched portion of the tie. And it would be impossible, at any time, to extend or stretch the tie, lining and reinforcing strip to the normal unstretched limits of the thread. It is obvious, therefore, that at no time during any stretching action of the tie will the thread be stretched in the least.

Assuming that the stitches should become disconnected by severance of the interconnecting portion of the thread, then, due to the tightening of the loop portion of each stitch around the tie elements, any movement of the broken ends of the interconnecting portion of the thread will be arrested by the tightened loop portions and thus prevented from further unraveling.

Figure 7:
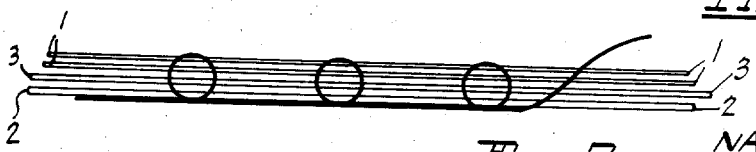
Fig. 7 illustrates a modified form of stitching which will accomplish some of the results obtained by the preferred form of stitching.

In the modified form of stitching illustrated in Fig. 7, I show the lining, reinforcing strip and folded edges of the tie casing arranged one above the other and stitched from the right to the left by what is commonly known as a back stitch. I am aware that this particular form of stitching has been used theretofore in tailoring generally, but I am not aware of its use in connection with neckties where the provision of a stitch to yield in the direction of the length of the tie under tension is most essential. It will be seen that this form of back stitching will likewise yield in one direction while the loop portion of the stitch is contracting at the same time.

The appended claims are to be read with the assumption that the parts of the tie occupy a horizontal position and where the term "lining member" is used, it is to be interpreted as including either a lining or a reinforcing strip, or other inner member of the tie to which the casing is attached.

It is also intended that the appended claims, which recite a "series" or "plurality" of stitches shall be interpreted to include embodiments of the invention in which all of the stitching uniting the parts of a tie is of one or more of the novel kinds disclosed herein; and also to embrace constructions substantially embodying the invention in which other types of stitches are employed in alternation or in series with said novel stitches, provided said other types of stitches do not prevent the functioning of said novel stitches in the manner herein disclosed.

I claim:

1. A method of forming neckwear consisting in arranging the tie casing inside-out and folded over on itself, arranging the two abutting edges thus formed along the longitudinal axis of the lining and reinforcing strip placed one above the other, then stitching said casing edges, lining and reinforcing strip by a series of stitches each formed by extending the thread downwardly through said tie elements, then forwardly, upwardly, rearwardly, downwardly, again forwardly thence back up to the surface from which it started, then advancing the thread forwardly to the beginning of the next stitch.

2. A necktie comprising a casing, lining and reinforcing strip united together by a series of spaced apart stitches, and each stitch being formed by the thread passing along one side of the casing thence through the casing, reinforcing strip and lining thence forwardly, upwardly, then rearwardly along the casing then downwardly through the lining then forwardly and upwardly through the surface of the casing from which it started and then forwardly to the beginning of the next stitch.

3. A necktie comprising a casing, reinforcing strip and lining united together by a series of spaced apart interconnected stitches, each stitch being formed by the thread extending along one surface of the tie casing then downwardly through the casing, reinforcing strip and lining, then into a vertically disposed loop portion to provide a reserve of thread and then from the bottom of the loop back upwardly through the casing, reinforcing strip and lining to the surface of the casing from which it started.

4. A method of forming a necktie which consists in arranging a tie casing with the longitudinal edges thereof superimposed upon each other, and then uniting said superimposed edges by stitching including a plurality of stitches, each formed by extending the thread downwardly through said superimposed parts, then forwardly, then upwardly through said parts, then rearwardly, then downwardly through said parts, then forwardly again, then back upwardly again to the surface from which it started, and then forwardly again to the beginning of the next stitch.

5. A necktie comprising a cloth casing having its longitudinal edges superimposed upon each other and united by stitching including a plurality of stitches, each formed by a thread passing along one side of the casing, then through the overlapping parts of the casing, then forwardly, then upwardly through said overlapping parts, then rearwardly along the casing, then downwardly through said overlapping parts, then forwardly, then upwardly through said parts to the surface of the casing from which it started, and then forwardly to the beginning of the next stitch.

6. A necktie comprising a casing and a lining member united with each other by stitching including a plurality of spaced stitches, each formed by passing a thread along one side of the casing, then downwardly through the casing and the lining member, then forwardly, then upwardly through the casing and lining member, then rearwardly along the casing, then downwardly through the casing and lining member, then forwardly, then upwardly through the casing and lining member to the surface of the casing from which it started, and then forwardly to the beginning of the next stitch.

7. A necktie comprising longitudinal overlapping parts united with each other by stitching including a plurality of spaced interconnected stitches, each formed by a thread extending along one surface of the tie, then downwardly through said overlapping parts, then into a vertically disposed loop portion surrounding a portion of said overlapping parts to provide a reserve of thread, and then from the bottom of the loop back upwardly through the overlapping parts to the surface of the tie from which it started.

8. A necktie structure comprising longitudinally overlapping and longitudinally stretchable parts including a casing folded over on itself inside out, said parts being united with each other by a series of interconnected stitches including spaced loops extending substantially in a single vertical plane longitudinally of the tie and each surrounding a portion of the overlapping parts to provide a reserve of thread to allow for longitudinal stretching of the tie by the tightening of the loops.

9. A necktie comprising longitudinally overlapping stretchable parts united with each other by a plurality of interconnected concealed stitches including spaced loops, each surrounding a portion of the overlapping parts to provide a reserve of thread to allow for longitudinal stretching of the tie by the tightening of the loops.

NATHAN GOLD.